Jan. 15, 1935.  J. H. GRAYSON  1,987,618
GAS COCK
Filed April 11, 1929

Inventor:
John H. Grayson
By Wilson & McCanna
Attys.

Patented Jan. 15, 1935

1,987,618

UNITED STATES PATENT OFFICE 1,987,618

GAS COCK

John H. Grayson, Lynwood, Calif., assignor, by mesne assignments, to Grayson Heat Control, Ltd., Lynwood, Calif., a corporation of California Application April 11, 1929, Serial No. 354,200

4 Claims. (Cl. 137—75)

This invention relates to gas cocks, and is particularly concerned with a gas cock adapted for use with a thermostatically controlled water heater.

Thermostatically controlled water heaters as they are now commonly available are subject to the criticism of having to be equipped with too many cocks; a shut-off or service cock screwed into the thermostat, a pilot light cock screwed into the shut-off cock, and a pressure regulator cock in the gas line leading to the heater, in addition to some form of dirt trap. These four individual devices, which the Underwriters' specifications called for, naturally involved considerable expense for these mere incidentals alone, not to mention the labor cost involved in the installation thereof, each necessitating separate handling and fitting, and it goes without saying that it was impossible to make a neat, workmanlike installation with such a multiplicity of fittings. It is, therefore, the principal object of my invention to provide what I choose to call a four-in-one gas cock embodying the shut-off cock, pilot light cock, pressure regulator cock, and dirt trap, all in one fitting, thus greatly reducing cost, and proportionately reducing the labor cost of installation, besides greatly improving the appearance of the heater when installed.

According to my invention, I provide a gas cock, the cast hollow body of which is generally of elbow form. In the one leg of the elbow, I mount a tapered plug serving as the shut-off or service cock. In the plug of the shut-off cock I mount an adjustable plug to restrict the hole in the shut-off cock depending upon the pressure in the gas line, thus providing a pressure regulator cock built into the shut-off cock. A branch is formed integral with the other leg of the elbow, and in this branch I mount another plug constituting the pilot light gas cock. The latter is preferably arranged to be adjusted with a screw driver for a more or less permanent setting. Between the two legs of the elbow I provide baffles suitably cast integral with the walls of the body and forming a dirt trap.

The invention is described in more detail hereinafter by reference to the accompanying drawing, wherein—

Similar reference numerals are applied to corresponding parts throughout the views.

Figure 1:
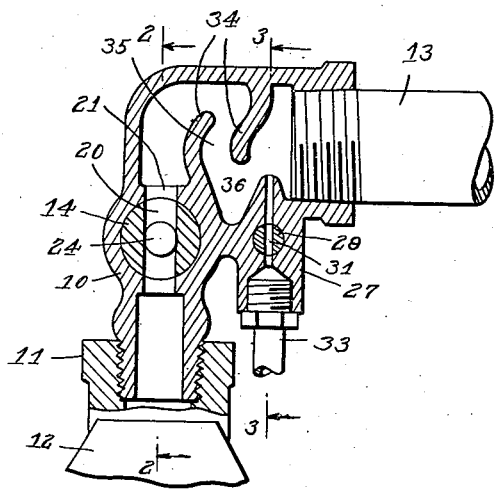
Figure 1 is a longitudinal section in a median plane through a gas cock made in accordance with my invention.
Figure 2:
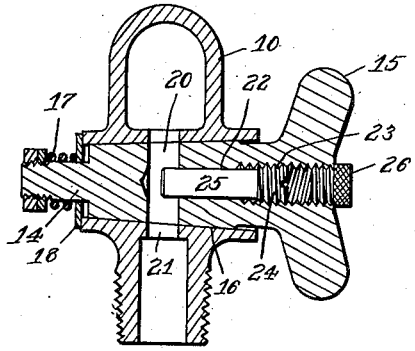
Fig. 2 is a transverse section on the line 2—2 of Fig. 1, showing the shut-off cock with the pressure regulator cock provided therein.
Figure 3:
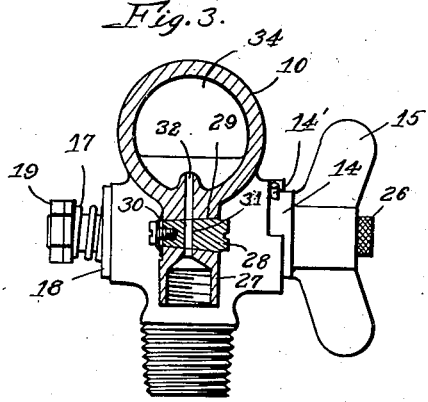
Fig. 3 is another transverse section on the line 3—3 of Fig. 1, showing the pilot light gas cock in section and the baffles behind the same in elevation.

The cock shown in Figs. 1 to 3, comprises a cast hollow body 10 of elbow form having the one leg thereof externally threaded to screw into the inlet 11 of a thermostatic valve 12 which controls the flow of gas to the burner of the heater, and having the other leg thereof internally threaded for connection with the gas supply line 13. A tapered plug 14 provided with wings 15 on the large end thereof to facilitate the turning thereof by hand, is urged inwardly for a close fit in the hole 16 in the body 10 by means of a spring 17 acting between a washer 18 and nuts 19 threaded on the reduced projecting end of the plug. The plug 14 has a transverse hole 20 provided therein arranged to register with ports 21 within the body 10, and constitutes the shut-off or service cock, the turning off of which shuts off the heater. A pin 14', appearing in Fig. 3, limits the turning of the plug 14 from fully opened to fully closed position, in an obvious manner. Now, the plug 14 of the shut-off cock has a center hole 22 drilled therein longitudinally from the large end to the transverse hole 20 with the outer end thereof tapped as shown at 23 threadedly to receive a plug 24. The latter has a smooth shank portion 25 fitting snugly in the hole 22, the end of which projects into the hole 20, as shown, to restrict the same so as to cut down the flow of gas through the shut-off cock in the event the gas pressure in the line is too high, to the end that excessive noise and the generation of carbon monoxide gas in the operation of the burner may be avoided. The plug 24 constitutes, in other words, a pressure regulator cock, and the fact that it is built into the shut-off cock means a saving in cost for the material employed, greater compactness, and neater appearance in the installation, and a certain saving in the labor cost of installation because of the fact that there are less fittings to be taken care of. It will be observed that the plug 24 is arranged to be adjusted by means of a screw driver. Another plug 26 is thereafter inserted in the outer end of the hole 22 to seal the same and prevent tampering with the pressure regulator adjustment by someone not familiar with its purpose.

A branch 27 is formed integral with the other leg of the elbow body 10, and has a small tapered plug 28 fitting in a tapered hole 29 provided therein. A spring 30 on the small end of the plug 28 urges the same toward a close fit in the hole. The plug has a transverse hole 31 provided therein arranged to register with a hole 32 drilled through the branch 27 and communicating at its inner end with the inside of the body 10. The plug 28, it will be observed, has a screw driver slot in the large end thereof so that the same can be adjusted with a screw driver for a more or less permanent setting, according to the size of flame desired for a pilot light. A copper tube 33 is connected through a suitable union with the branch 27 and leads to the pilot light of the burner. It will be evident that the forming of the pilot light gas cock in a unitary assembly with the shut-off cock results in many advantages; there is a saving in cost due to the elimination of a separate fitting, a saving in labor cost of installation by eliminating an extra fitting to be handled, and the resulting assembly presents a far more workmanlike appearance. The fact that the pilot light cock has the body thereof provided in the form of an integral enlargement of the body 10 at the bend thereof is of further advantage because it permits the tube 33 leading to the pilot light to be extended in the same direction with and parallel to the leg that is threaded into the inlet 11 of the thermostatic valve 12, thus making for a direct pilot light connection and one which is more or less inconspicuous and does not detract from the otherwise neat appearance of the gas connections as a whole. The construction is such that the elbow-shaped body 10 provides a single inlet leg and two outlet legs in parallelism, the one leading to the thermostatic valve and the other to the pilot light, and this makes for compactness and at the same time facilitates connection of the unit with the hot water heater.

Baffles 34 are formed integral with the walls of the elbow body 10 on the inside thereof between the legs thereof, as best appears in Fig. 1, so that a circuitous passage 35 is formed therebetween, the first dip in which serves as a dirt trap, as shown at 36. Any dirt particles entrained with the gas supplied from the line 13 are bound to be deposited in the trap 36, at least particles which would be large enough to prevent the thermostatic valve 12 from closing completely. The incorporating of the dirt trap in the same fitting with the shut-off, pressure regulator, and pilot light cocks obviously means a still further saving in cost, still further compactness and neatness in appearance, and a still further saving in the labor cost of installation.

Figure 4:
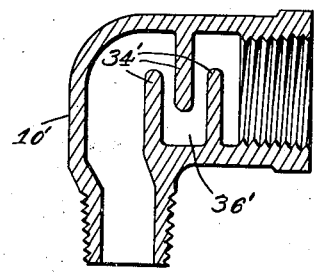
Fig. 4 is a longitudinal section through a dirt trap elbow fitting made generally along the lines of the fitting shown in Fig. 1, but omitting the three cocks thereof.

While I have illustrated the four devices all embodied in a four-in-one gas cock, it should be evident that any two or more might be embodied in a single fitting in the novel relationship herein disclosed, as for example, the pressure regulator cock might be built into the shut-off cock in a single fitting, or the pilot light cock might be built into one fitting with the shut-off cock, or with the pressure regulator cock incorporated in the latter, or the dirt trap might be incorporated with the shut-off cock with or without the pressure regulator cock in a single fitting, or with the pilot light cock. In any of these events, a certain saving in cost for materials, as well as a certain saving in cost of labor installation would be realized, although not to the extent realized where the four devices are embodied in one fitting. Furthermore, as shown in Fig. 4, I may provide a dirt trap 36' by forming the baffles 34' integral with the walls of an elbow body 10' between the legs of the latter in generally the same manner as disclosed in Fig. 1, this elbow fitting being entirely separate and distinct from the shut-off, pressure regulator, and pilot light cocks. It has not been deemed necessary to illustrate the other variations from the invention as disclosed in Figs. 1 to 3, referred to above.

It is believed the foregoing description conveys a clear understanding of all of the important advantages of my invention. The appended claims have been drawn with a view to affording a full measure of protection not only on the construction disclosed, but also such modifications as will no doubt suggest themselves to those skilled in the art to which the invention relates as a result of this disclosure.

I claim:

1. A gas fitting comprising an elbow-shaped hollow body, one leg of which is arranged to serve as an inlet for gas and the other as an outlet, a branch formed integral with the inlet leg of the body, the same having a hole therethrough communicating with the inside of the body, the inner end of said branch having integral therewith a projection on the inside of the body extending above the bottom wall of the inlet leg, said body having a wall formed integral with one side of the outlet leg of the body and extending transversely of the bottom of the inlet leg in spaced relation to said projection, the body being formed between said projection and wall to provide a recess in the bottom wall of the inlet leg to serve as a dirt trap, and said body having another wall formed integral with the top wall of the inlet leg and extending transversely thereof between the aforesaid projection and wall and extending downwardly therebetween into said recess whereby to provide a circuitous passage through the body.

2. A gas cock for use in connection with a gas appliance having a main burner and pilot burner requiring two gas conduits extending thereto, the cock comprising an elbow-shaped body member having a gas passage extending angularly therethrough, one leg of the elbow constituting the inlet and the other leg of the elbow being in transverse relation to the first leg and constituting the main outlet therefor, said body member having an enlargement adjacent to the bend thereof provided with a passage therein communicating with the aforesaid passage, said enlargement being formed to provide a smaller secondary outlet portion substantially parallel to the main outlet and extending in the same direction from the inlet to permit connection of said outlets in substantially parallel lines, the main outlet being adapted to have connection with the gas burner and the secondary outlet being adapted to have connection with the pilot light therefor disposed adjacent thereto.

3. A gas cock for use in connection with a gas appliance having a main burner and pilot burner requiring two gas conduits extending thereto, the cock comprising an elbow-shaped body member having a gas passage extending angularly therethrough, one leg of the elbow constituting the inlet and the other leg of the elbow being in transverse relation to the first leg and constituting the main outlet therefor, said body member having an enlargement adjacent to the bend thereof provided with a passage therein communicating with the aforesaid passage, said enlargement being formed to provide a smaller secondary outlet portion to permit connection of said outlets, with the secondary outlet in close proximity to the main outlet, the main outlet being adapted to have connection with the gas burner and the secondary outlet being adapted to have connection with the pilot light therefor disposed adjacent thereto.

4. A gas fitting comprising an elbow-shaped hollow body, one leg of which is arranged to serve as an inlet for gas and the other as an outlet, a branch formed integral with the inlet leg of the body in close proximity to the outlet leg, and extending in the same direction with said outlet leg from the inlet leg, whereby to facilitate connection of the main outlet with a gas burner and connection of the branch with the pilot light thereafter, the branch having a hole therethrough communicating with the inside of the body, the inner end of said branch having integral therewith a projection on the inside of the body extending above the bottom wall of the inlet leg, said body having a wall formed integral with one side of the outlet leg of the body and extending transversely of the bottom of the inlet leg in spaced relation to said projection, the body being formed between said projection and wall to provide a recess in the bottom wall of the inlet leg to serve as a dirt trap, and said body having another wall formed integral with the top wall of the inlet leg and extending transversely thereof between the aforesaid projection and wall and extending downwardly therebetween into said recess whereby to provide a circuitous passage through the body.

JOHN H. GRAYSON.